(12) United States Patent
Kocher (10) Patent No.: US 7,028,018 B2
(45) Date of Patent: Apr. 11, 2006

(54) COOPERATIVE BIOMETRICS ABNORMALITY DETECTION SYSTEM (C-BAD)

(75) Inventor: Robert William Kocher, Arlington, VA (US)

(73) Assignee: Ideal Innovations, Inc., Arlington, VA (US)

( * ) Notice: Subject to any disclaimer, the term of this patent is extended or adjusted under 35 U.S.C. 154(b) by 579 days.

(21) Appl. No.: 10/143,795

(22) Filed: May 14, 2002

(65) Prior Publication Data
US 2003/0217024 A1 Nov. 20, 2003

(51) Int. Cl.
*G06F 17/00* (2006.01)
(52) U.S. Cl. ........................................ 706/47
(58) Field of Classification Search .................. 706/47
See application file for complete search history.

(56) References Cited

U.S. PATENT DOCUMENTS 5,983,200 A * 11/1999 Slotznick ...................... 705/26
6,205,233 B1 * 3/2001 Morley et al. ............... 382/103
6,758,397 B1 * 7/2004 Catan .......................... 235/385
6,785,379 B1 * 8/2004 Rogers et al. ............ 379/265.02

OTHER PUBLICATIONS

Hohm et al, "Using Incremental Learning for Transition from Rule Based Behavior to Motion Sequences for Motor of a Flexible Robot System", IEEE International Conference on Systems, Man, and Cybernetics, Oct. 1999.*

* cited by examiner

*Primary Examiner*—George Davis (57) ABSTRACT

The Cooperative Biometrics Abnormality Detection (C-BAD) system is a network of sensors that track personnel throughout physical locations, communications, and computer systems. These systems are then linked to a central computer that contains detailed information on the individual, and rule-based risk, relationship, and abnormality models that will deter. detect, and document possible insiders. It is only at this point that C-BAD will then objectively report suspicious activities to a supervisory team for further investigation. (C-BAD) This System replaces previous current labor-intensive, subjective analysis, which has proven to be a weak deterrent and fraught with human error. C-BAD uses a full spectrum of sensors that identify personnel through the use of contact, contactless, biometrics, smart cards, or a combination of any one of these. The C-BAD central monitoring computer contains an inference engine based on artificial intelligence or a rule-based system, which reviews databases and furnished information.

7 Claims, 8 Drawing Sheets

COOPERATIVE BIOMETRICS ABNORMALITY DETECTION SYSTEM (C-BAD)

FEDERALLY SPONSORED RESEARCH

Not Applicable

REFERENCE TO A MICROFICHE APPENDIX

Not Applicable

BACKGROUND

1. Field of Invention

This invention relates to biometrics, contactless tags and sensors specifically used to monitor and track an individual's activity. Through the utilization of rule-based software, said systems will detect abnormalities in behavior and alert authorized security personnel and supervisors so they may initiate further investigation.

2. Description of Prior Art

Internal threats (Insider threats), account for more damage to an organization than external ones. An organization's resources are typically used to prevent external threats with an implicit trust applied to those individuals within the system. Currently, basic human observation is the main form of detection used when an organization suspects an insider of abnormal activity. The inherent problem with this approach is the reliance on co-workers or employees to recognize one of their own as a possible threat. Employees, in most cases, rationalize suspicious insider activity due to their inability to conceive any co-worker as a threat. Consequently, investigating employees do not take action until significant damage has occurred. It is this uninformed view of threats by both the organization and its employees that sets the stage for this kind of activity.

In a recent study of 100 information security systems, violations by personnel with authorized access to their respective information systems occurred under the following intent classifications: 45% were clearly malicious, 13% were possibly malicious, 10% were criminal, and 33% were believed to be human errors. At least half of the personnel who caused the insider damage were information technology professionals. Of this 50%, 19% were top-level system administrators and 31% were assistant system administrators. Of the other 50%, 40% had limited system access and 8% were basic users.

Typically, in the event of suspicious activity, personnel know the individual and tend not to believe this person is a participant in such an event. In essentially every instance, co-workers know the individual has all, and sometimes a higher level of the appropriate clearance. It is too difficult to report a fellow employee without confronting the individual. Typically, the investigating employee makes an inquiry of the individual regarding the suspicious activity, and is satisfied with the suspect's answer. The insider continues these activities but is now more careful.

When reviewing previous insider cases, all the indications were present, yet co-workers rationally justified inappropriate behavior, and the insider's activities continued. Many insiders were caught only when extraordinary evidence was presented, i.e. a friendly insider from the other side intercepted correspondence, or a major insider blunder occurred that pointed directly to the suspected individual. It was only after one or both of these events occurred that the insider was brought to management's attention.

Currently, crude, documentation-based tracking systems exist and range from personnel signing in with a guard for after-hours access to electronically logging them in whenever the individual enters the facility. In an attempt to control access to classified materials, tracking within the facility is generally limited to combination locks and a paper roster that requires the employee to sign a log when entering and exiting secure areas. Access to copying or printing classified files is not normally tracked.

Most systematic approaches involve tedious and labor-intensive procedures in an attempt to detect abnormalities. Such efforts may track personnel who go to their office after regularly scheduled work hours. Others attempt to track personnel who access classified information, make copies, or attempt access into areas of which they are not authorized.

Another common method for detecting insiders is through routine polygraph tests. This method has demonstrated merit but is not conclusive. Once a polygraph indicates a suspected case of deception, it does not indicate the extent of damage caused by the insider. Determining the extent of the damage caused leads management into to a whole spectrum of new problems.

OBJECTS AND ADVANTAGES

The Cooperative Biometrics Abnormality Detection System (C-BAD) is truly an innovative approach that automatically monitors personnel that have access to sensitive material. Through the use of artificial intelligence or rule-based software, or inference engines, C-BAD will determine if abnormalities are occurring, and, if so, evaluates the individuals involved, associates risks, documents events, and alerts a human operator to initiate further investigation. C-BAD removes the human element from initially determining if a friend or co-worker is an insider. Most insiders do not appear to be insiders to others, resulting in personnel overlooking or rationalizing suspicious activity. C-BAD will provide much needed monitoring of access areas, and through the use of biometrics, will provide irrefutable evidence as to which individuals are involved in suspicious activity. The employment of biometrics in a networked system, which will provide significantly, improved supervision of all sensitive areas where traditional monitoring consisted of individuals with the correct badges, personal identification numbers, or keys.

C-BAD can be operated by the organizations' security and management personnel or by a third party such as a higher-level security Inspector General (IG) or disinterested party to the individuals monitored.

C-BAD reports abnormalities to authorized security personnel or managers who then initiate further investigation of the situation. At this point, authorized persormel then inform the C-BAD system to accept this activity from the individual involved or adjust the C-BAD sensitivity to a lower threshold level to detect if a similar incident involving the same individuals occurs in the future.

C-BAD is an effective approach in deterring a good person from going bad. The typical insider does not start out with bad intent; rather, the individual commits these acts due to coercion, threats, blackmail, greed, or a disgruntled attitude. But, in all cases, the individual becomes an insider because he feels he can get away with this kind of activity. The insider feels that he has his co-worker's confidence and will be relatively free from detection. With a C-BAD system, individuals may be deterred from becoming an insider due to the increased chances of being caught.

C-BAD will increase an individual's privacy due to monitoring by a machine rather than by management or other personnel. Current methods of using other employees to monitor correspondence and activities greatly lends to the adverse "Big Brother" environment. The key objection to the "Big Brother" fear is that discrimination and biased targeting of individuals will occur. C-BAD would apply the rule-based system fairly to everyone thus reducing the fear by personnel of being unfairly targeted.

C-BAD has the potential to provide state-of-the-art technology to prevent and/or contain the greatest insider threats to government and industry through automatic monitoring, detection, impartial decision-making, and documentation of activities. Most importantly, it provides a deterrent for a good employee who may be contemplating going bad.

SUMMARY

The Cooperative Biometrics Abnormality Detection (C-BAD) system is a network of sensors that track personnel throughout physical locations, communications, and computer systems. These systems are then linked to a central computer that contains detailed information on the individual, and rule-based risk, relationship, and abnormality models that will deter, detect, and document possible insiders. It is only at this point that C-BAD will then objectively report suspicious activities to a supervisory team for further investigation. This System replaces previous current labor-intensive, subjective analysis, which has proven to be a weak deterrent and fraught with human error. C-BAD uses a full spectrum of sensors that identify personnel through the use of contact, contactless, biometrics, smart cards, or a combination of any one of these. The C-BAD central monitoring computer contains an inference engine based on artificial intelligence or a rule-based system, which reviews databases and furnished information.

DRAWINGS

Drawing Figures

In the drawings.

LIST OF REFERENCE NUMERALS

Item 1=C-BAD Central Processing Unit (CPU).
Item 2=communication links and network connecting components to the CPU and internal components links and networks.
Item 3=Physical Access Sensor network.
Item 4=Information Access Sensor network.
Item 5=Communication Access Sensor network.
Item 6=External Personnel Events database and network.
Item 7=External Personnel Relationship database and network.
Item 8=Abnormality Software Model.
Item 9=Normality Software Model.
Item 10=Personnel Risk Software Model.
Item 11=External Events Software Resolution Model.
Item 12=Security Compartments Software Model.
Item 13=Event Reporting Software Model.
Item 14=Event Resolution Software Model.
Item 15=External Relationships Software Resolution Model.
Item 16=Personnel identification sensors located in the hallway or channeled path.
Item 17=Personnel identification sensor located on floor or in an area.
Item 18=Personnel identification sensor to safe, cabinet, or container.
Item 19=Personnel identification sensor located on internal building door.
Item 20=Personnel identification sensor located on external building door.
Item 21=Personnel identification sensor for computer access.
Item 22=Personnel identification sensor for printer access.
Item 23=Personnel identification sensor for computer copy commands.
Item 24=Personnel identification sensor for protected file access.
Item 25=Personnel identification sensor for classified phone access.
Item 26=Personnel identification sensor for unclassified phone access.
Item 27=Personnel identification sensor for other communication systems.
Item 28=Personnel identification sensor for INTER or INTRA net access.
Item 29=Personnel identification sensor SIPR or classified INTER or INTRA net access.
Item 30=Input and database from law enforcement reports.
Item 31=Input and database from intelligence services reports.
Item 32=Input and database from financial transaction records.
Item 33=Input and database from other personnel activities.
Item 34=Input and database from terrorist organizations.
Item 35=Input and database from FBI/CIA watch list of selected organizations.
Item 36=Input and database as they relate to current employees with foreign country watch lists.
Item 37=Input and database as they relate to current employees with personnel who have questionable backgrounds.
Item 38=Input and database as they relate to current employees with financial transactions.
Item 39=Input and database as they relate to current employees with other relationships that may influence insider behavior.
Item 40=the authority by which abnormalities are reported for further investigation.
Item 41=the communication link from the CPU to the Investigative Team.
Item 42=security managers on watch for abnormality reports.

Item 43=upper management on watch for abnormality reports.
Item 44=investigative teams that look into abnormalities and recommend resolution.
Item 45=investigative procedure model.
Item 46=archiving and documentation repository.

DETAILED DESCRIPTION

Figure 1:
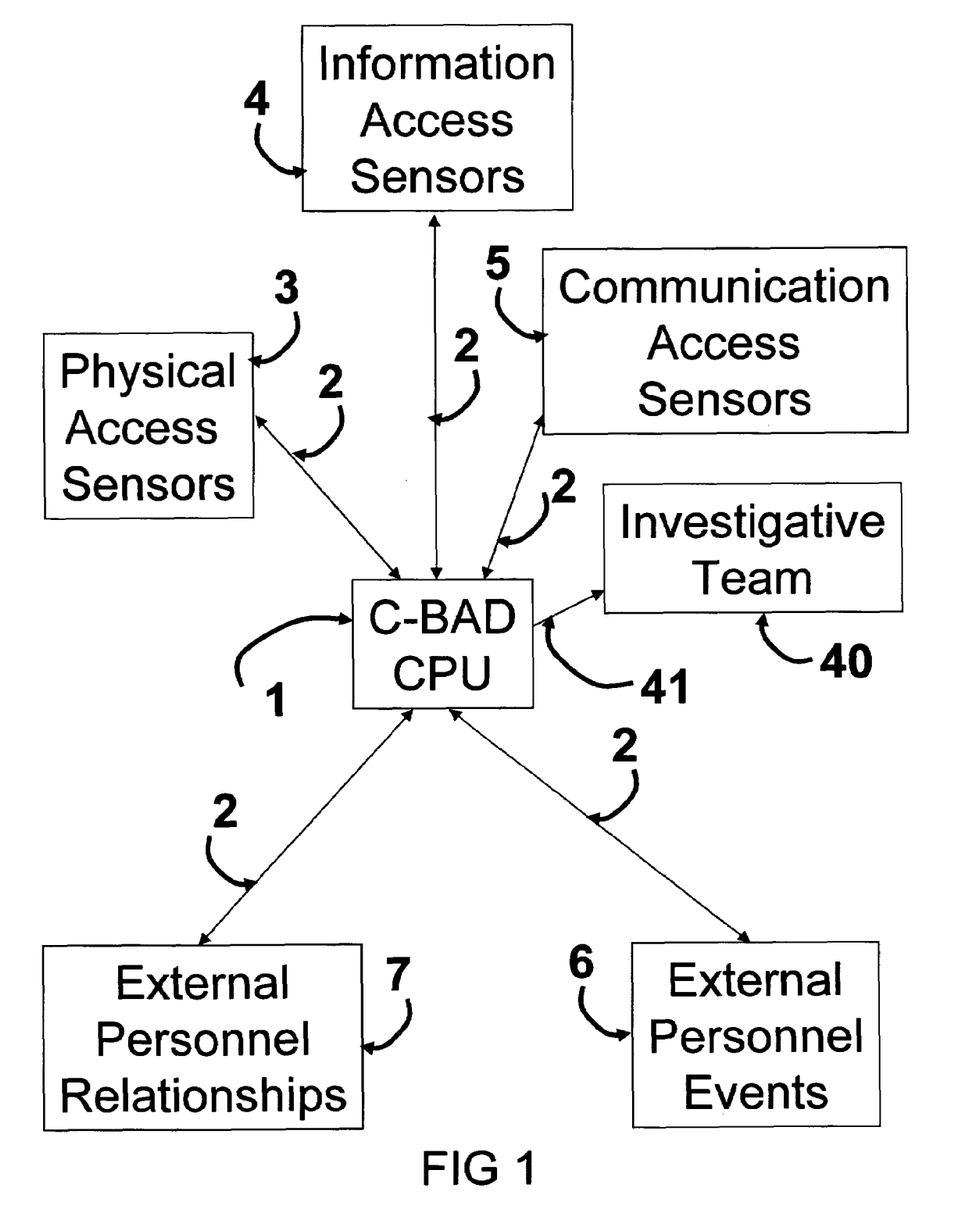
FIG. 1 shows the entire system and the following drawing depicts each component of the system and its related parts/and FIG. 1 shows the basic components and relationships of the C-BAD system.

Description-FIG. 1-*Preferred* Embodiment

The heart of the Cooperative Biometrics Abnormality Detection (C-BAD) is the Central Processing Unit C-BAD CPU 1. The CPU 1 is connected through a communication network 2 to each major sensor subsystem. These subsystems consist of a Physical Access Sensor network 3, Information Access Sensor network 4, Communication Access Sensor network 5, External Personnel Events database 6, and External Personnel Relationship database 7. The data provided from these sensors, databases, and external sources is analyzed in the CPU 1 and notifies an investigative team 40 or senior management over a communications link 41 when abnormalities are detected.

Figure 2:
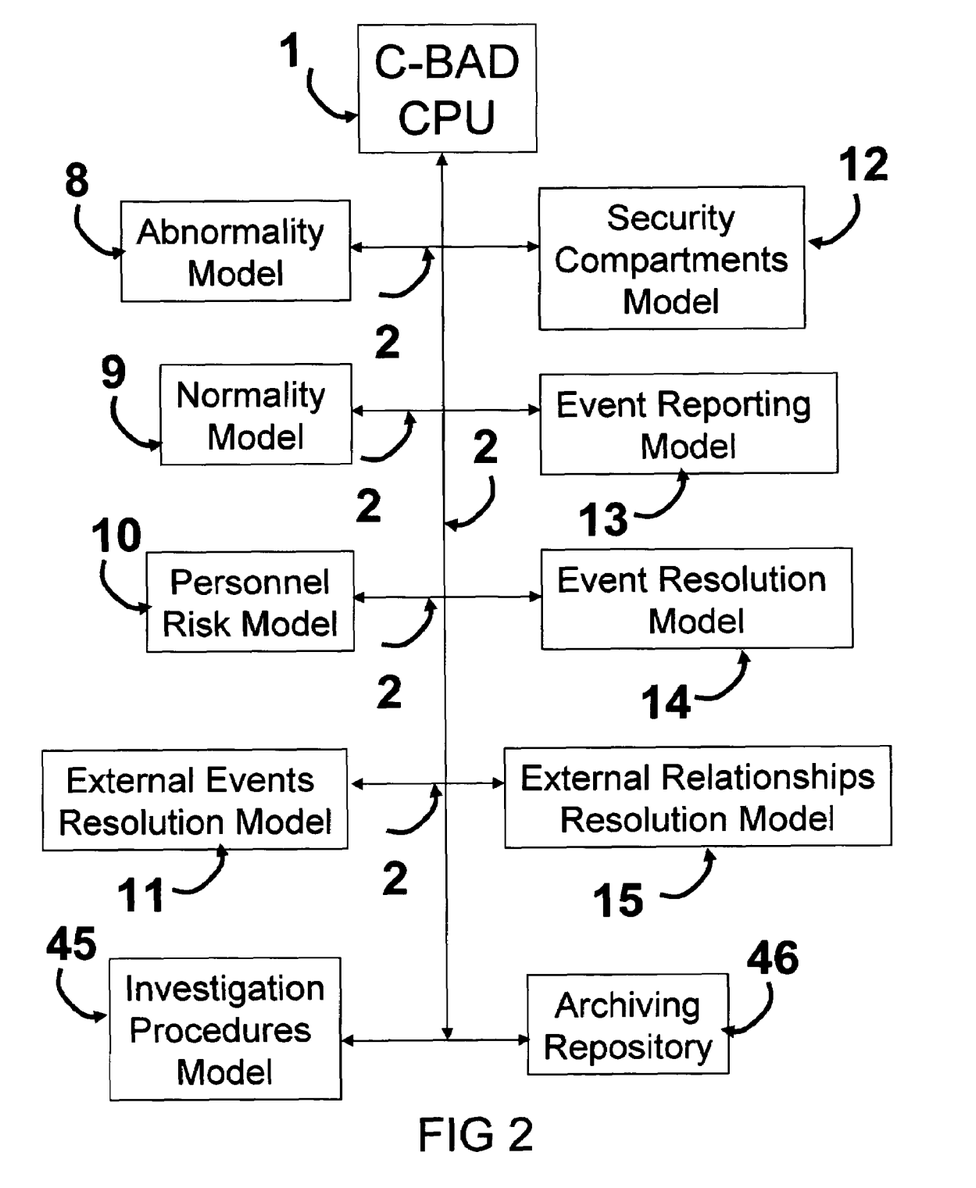
FIG. 2 shows the software and logical components of the C-BAD central processing unit (CPU).

Description-FIG 2

The C-BAD CPU 1 is a computer system that is rule-based or artificial intelligence or inference engine-based consisting of various logic models that provide the rules of abnormality and normality. The CPU 1 also contains a recording and documenting system (archiving system) 46 that archives all sensor inputs for future event analysis. The abnormality model 8 has a list of rules that define abnormality; for example, the sensors detect when a person is attempting to log into a computer, yet there is no record of this individual entering the building. Other abnormalities could be an individual, with no prior history of going to his office on a weekend, initiates a pattern of this activity. The abnormality model 8 looks for behavioral patterns across an individual's physical, informational, file, and communication systems to determine if there is a specific abnormality. The abnormality model 8 establishes general and specific abnormality rules for each member of the organization. The counterpart of abnormality model 8 is normality model 9. Normality model 9 provides guidance as to each member of the organization as to normal behavior. For example, a particular individual typically works late hours and weekends while another person does not. Normality model 9 establishes normal activities for each individual. The personnel risk model 10 assigns risk ratings to each individual with respect to the amount of classified information the individual can access or the permissions the individual has to change or alter the information structure. This model compares the organizational vulnerabilities to its member as if this individual were an insider threat. For example, the information systems administrator would pose a greater organizational risk than a lab worker with less security clearance levels and system access authorizations. The security compartments model 12 assigns risks to individuals that have access to multiple security compartments. This model will then report when sensors indicate an individual is being exposed to information from compartments that were designed to be separated from the same individual. The external events resolution model 11 is based on links to law enforcement and community reporting networks. The external events resolution model 11 looks at all events that involve an employee along with the abnormality model 8 to determine if the event rises to the level of abnormal or risky behavior. For example, an employee being arrested for drugs is a flagged event, while a speeding ticket in Idaho would be considered only because the employee was out of state and additional links may be inferred from the incident report. The external relationship resolution model 15 is linked to external databases that contain various kinds of personal information such as address, phone number, employment, organizations, groups, and family relationships. Information can also be provided from law enforcement, intelligence, or security organizations. This model would identify any relationship between an employee and other people with questionable backgrounds, i.e. whether they are members of the same organization or shared a phone number, address, financial relationship, et cetera. The external relationship resolution model, 15 in conjunction with the abnormality model 8, determines if the relationship rises to the level of abnormal or risky behavior. The event reporting model 13 reviews input from all models, assigns a risk score, and then compares, in accordance with established rules, the risk score to the established thresholds. If the score exceeds established thresholds, the event is reported to the investigative team 40. The events resolution model 14 receives the investigation report resolution and additional guidance. If the individual was found to be operating in an approved manner, the events resolution model 14 provides modifications to the other models as to this particular individual, if any and new instructions based on the investigative team's finding.

Figure 3:
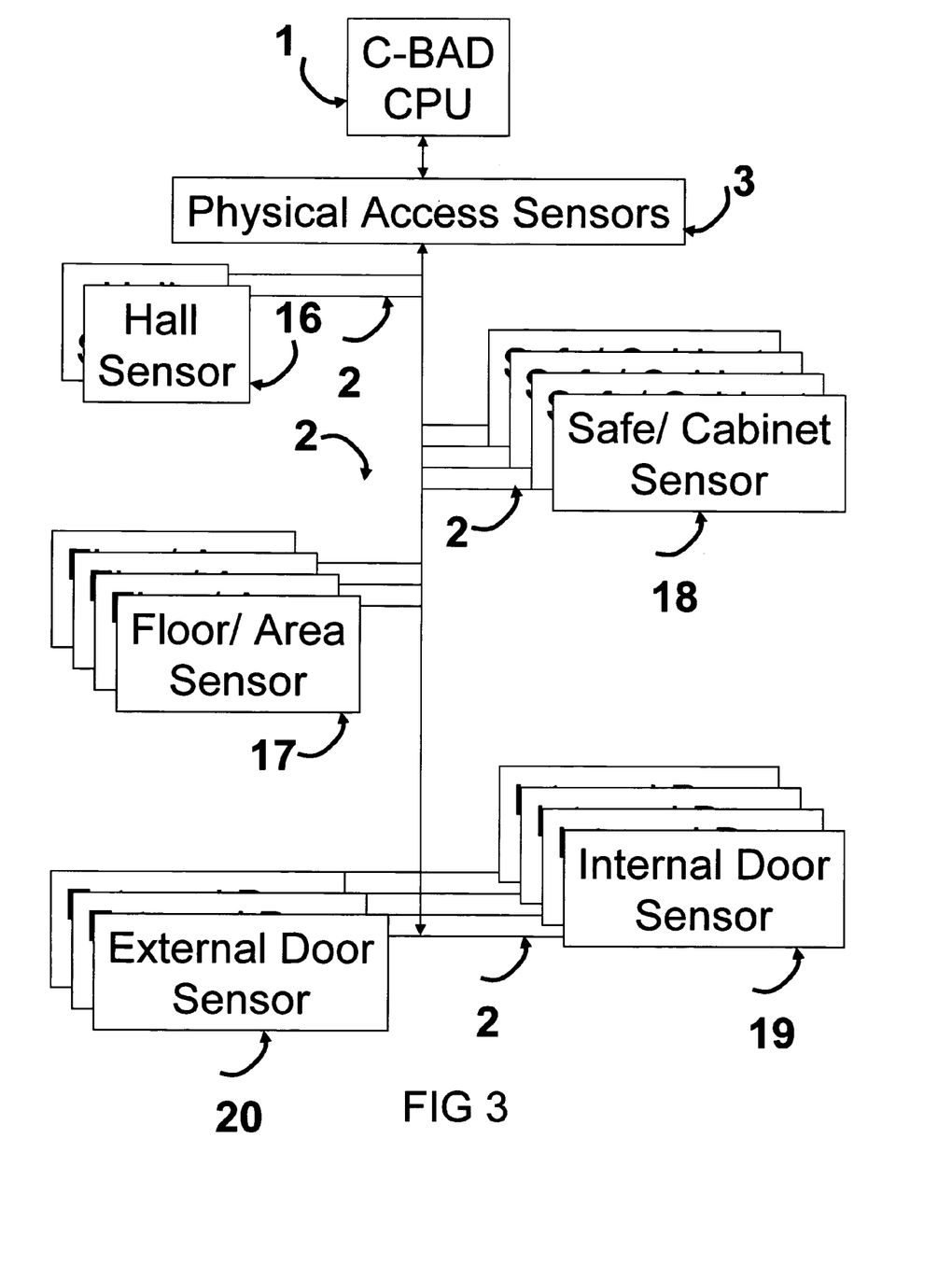
FIG. 3 shows various types of physical access sensors linked in a network to the C-BAD CPU.

Description-FIG 3

FIG. 3 depicts the communications links 2 networked to physical access sensors 3. These sensors can be located in the hall 16, floor or area 17, safe or cabinet 18, external door 20, and internal door 19. C-BAD's key component is its identification of the individual with a high degree of accuracy. Biometrics is a common technology that could not only provide the necessary degree of identification in a variety of forms, but also be utilized in any of the aforementioned areas. Various forms of biometric security are fingerprint, hand geometry, facial recognition or iris. Other sensors could utilize smart cards, tokens, proximity cards, radio frequency identification devices (RFID), personnel identification number (PIN) number pads, or other devices. All of these systems and devices are designed to restrict entry into a secured area to authorized individuals. The person who has authorized access cooperates with the system's sensors to prove identity. These sensors are viewed as cooperative because the individual is viewed as a friendly; thus the term "cooperative biometrics". The physical access sensor network 3 feeds into the C-BAD CPU 2 for processing and analyzing of data.

Figure 4:
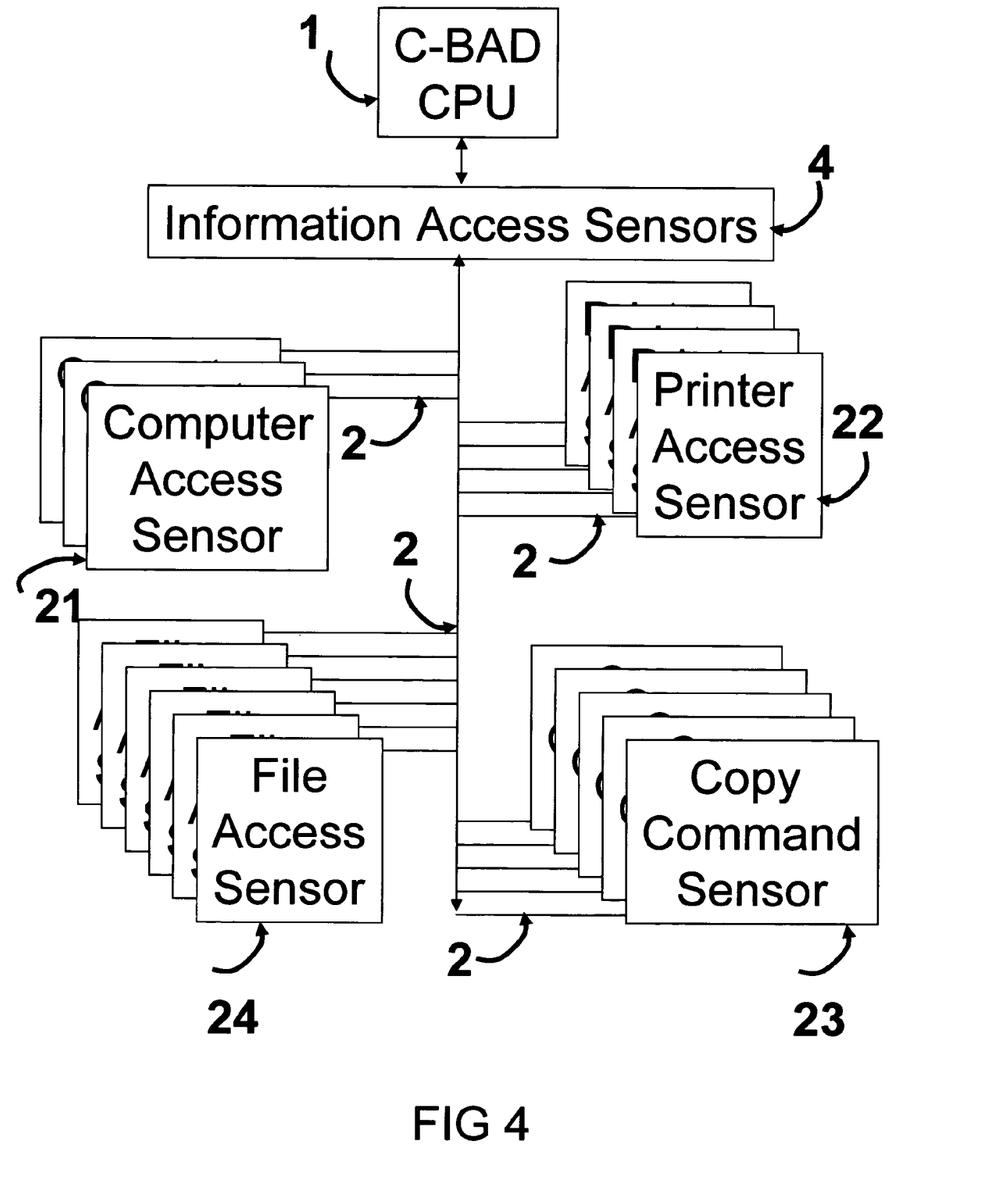
FIG. 4 shows various types of information access sensors linked in a network to the C-BAD CPU.

Description-FIG. 4

FIG. 4 depicts the communications links 2 networked to information access sensors 4. Information access sensors are computer access sensors 21 such as log on systems, PINs and passwords. File access sensors 24, include software that allows access to files and folders stored on the computer; print access sensors 22 which monitor and document who printed sensitive or classified files; and the copy command sensor 23, which monitors individuals making electronic copies of sensitive and classified files. As with the physical access sensor network 3, biometrics versions of these sensors provide a high degree of confidence for an individual's identity.

Figure 5:
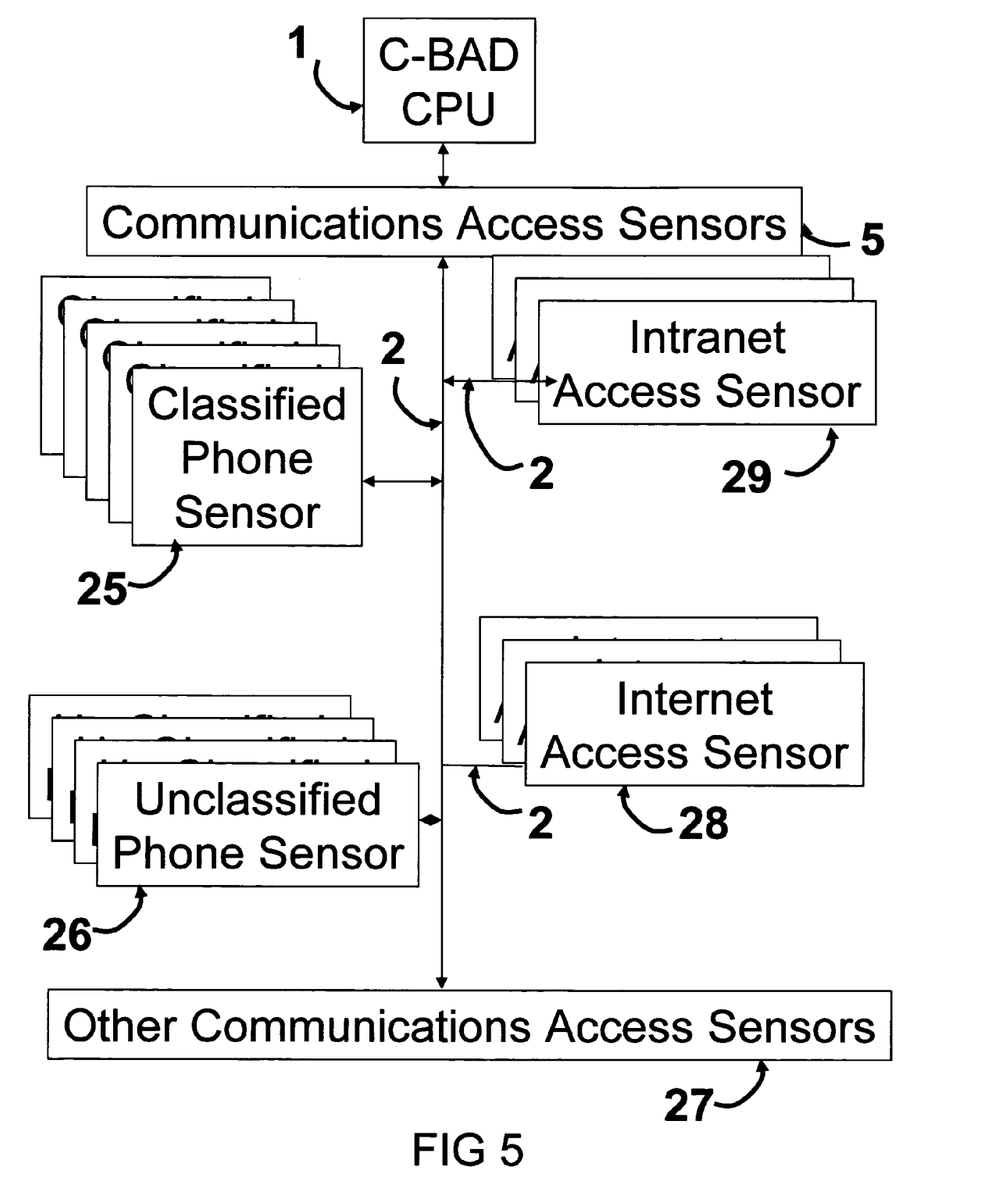
FIG. 5 shows various types of communication access sensors linked in a network to the C-BAD CPU.

Description-FIG 5

FIG. 5 depicts the communications links 2 networked to communication access sensors 5. Communications access sensors are ones that document and record communication equipment such as phones, faxes, Internet and Intranet systems. Classified 25 and unclassified 26 phone sensors document and record who used a particular classified phone, which telephone numbers were dialed, what organizations were contacted, and whose individual phone number was dialed. For example, if a foreign government embassy or country is called, this maybe considered an abnormality for a particular individual. Again, by using biometrics sensors such as voice recognition or fingerprint access, the calling individual is positively identified. Intranet 28 and Internet 29 access would first require identification and authentication of an individual to use the system then monitor activity regarding selected sites, email address, and communications. Other communications access sensors 27 could be used to track who is communicating with whom.

Figure 6:
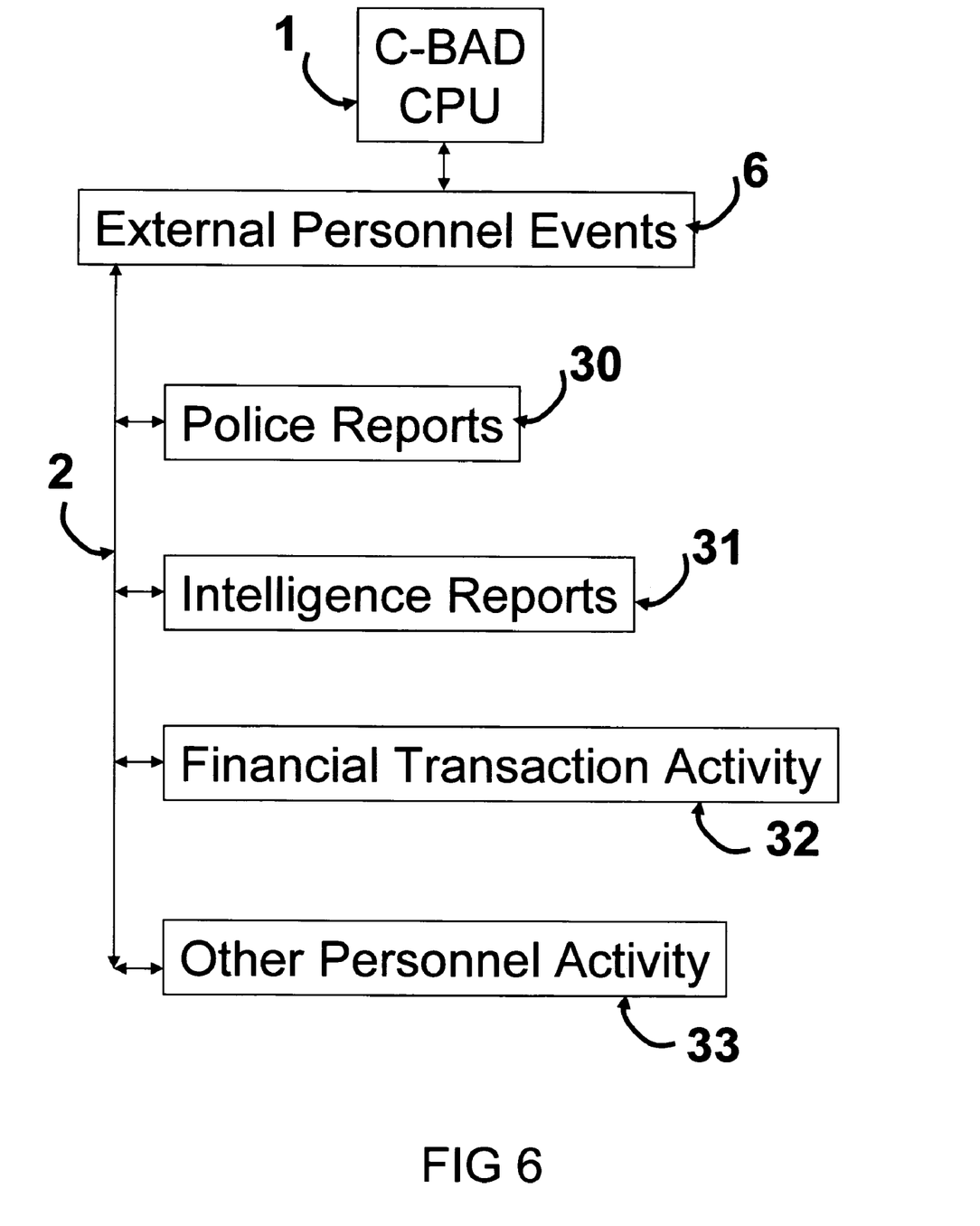
FIG. 6 shows various types of external events databases linked in a network to the C-BAD CPU.

Description-FIG. 6

FIG. 5 depicts the communications links 2 networked to the external personnel events 6 network. External personnel events are activities occurring outside the organization that may be relevant when attempting to detect suspicious behavior or when placing an individual in a higher risk category. Source are police reports 30 which disclose if an employee is arrested for criminal activity; intelligence reports 31 that may reveal involvement of an employee in a subversive organization; financial transaction activity 32 which may disclose standard back reports to the IRS for deposits over $10,000 in cash or transactions from watch-list organizations; and other personal personnel activity 33 from sources that may increase an employee's risk level.

Figure 7:
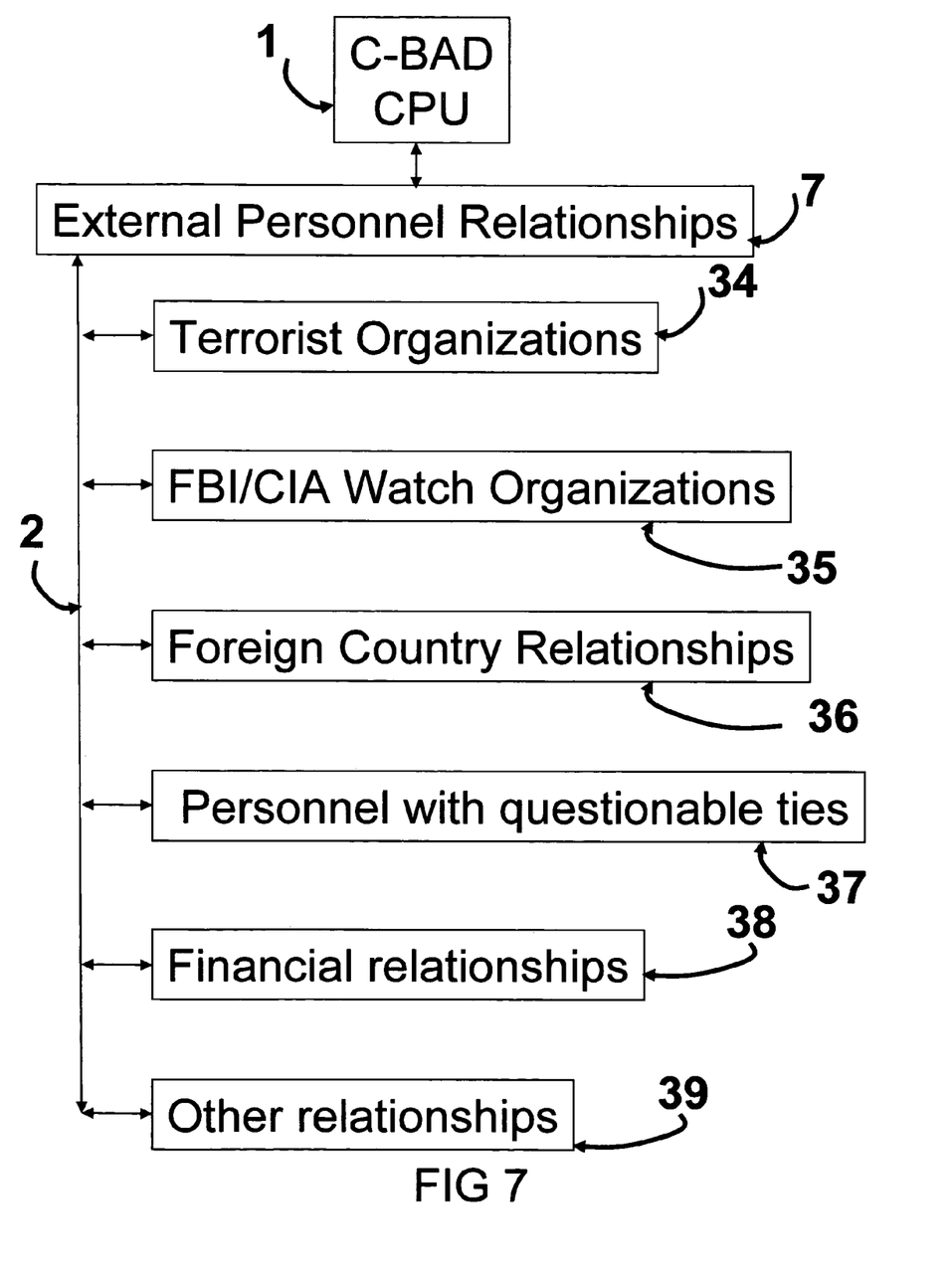
FIG. 7 shows various types of external personnel relationships databases linked in a network to the C-BAD CPU.

Description-FIG. 7

FIG. 7 depicts the communications links 2 networked to external personnel relationships databases 7. This information would examine past membership or association with organizations or personnel associated with these organizations. Particular organizations of concern would be terrorist organizations 34; FBI/CIA watch-list organizations 35; foreign country relationships 36; employees with links to persons with questionable backgrounds 37; employee financial relationships 38 with banks, investments, foreign land holdings, et cetera; and other relationships 39 could be added to enhance the C-BAD system capability for detecting abnormal activities or risky behavior.

Figure 8:
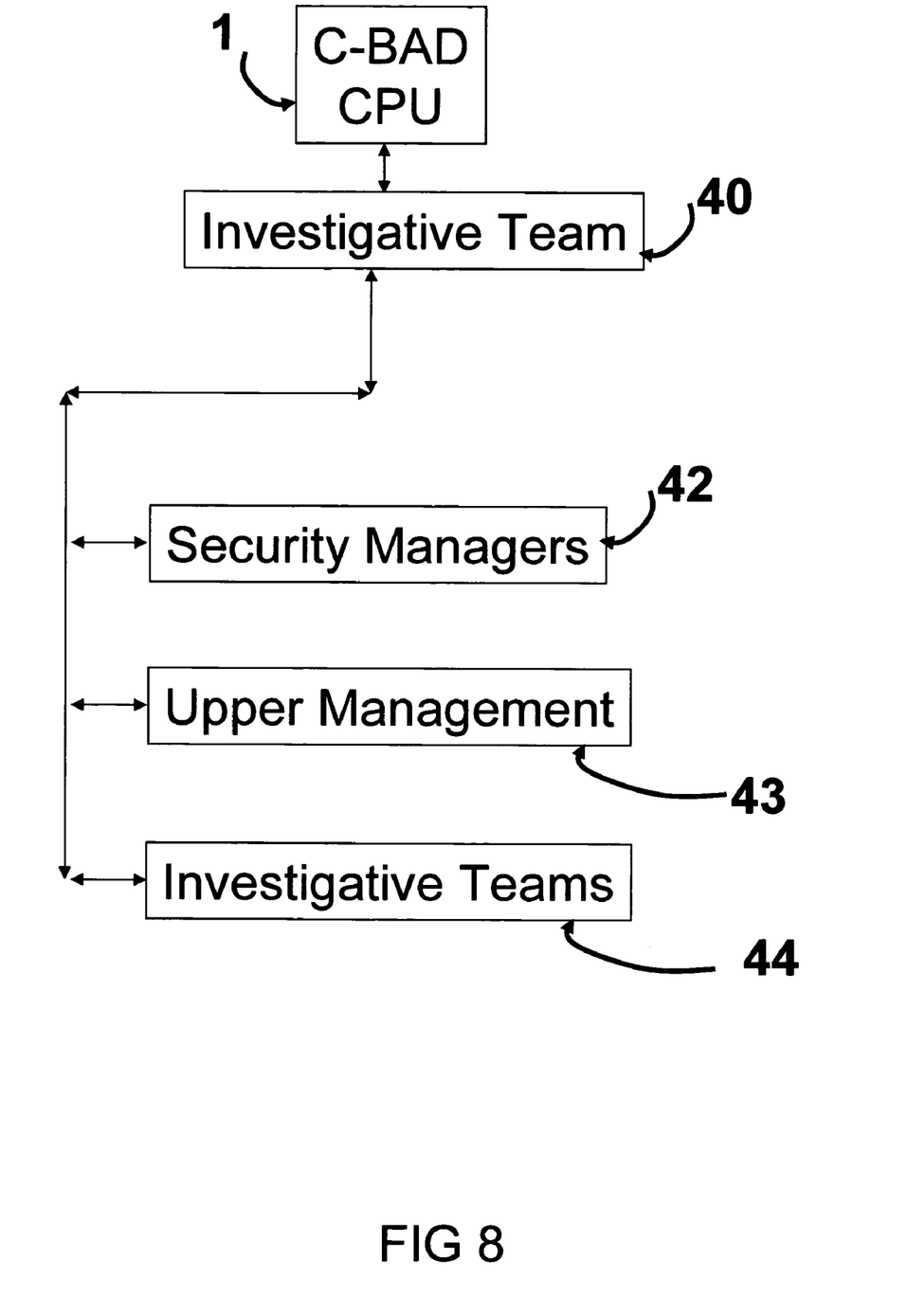
FIG. 8 shows the configuration of the Investigative Team.

Description—FIG. 8 Investigative Team

FIG. 8 depicts the organization of the investigative team 40 consisting of upper management 43, security managers 42, and lower level investigative teams 44. An alternative team configuration is to contract with a disinterested third party. Upper management, the security managers, and the investigative team should also be subjected to the C-BAD system and all detection results should be further investigated in teams of two persons. With respect to insider security, a two person rule should always apply and biometric sensors should be used whenever possible to enhance positive and documented access.

OPERATION OF INVENTION

The operation of the Cooperative Biometrics Abnormality Detections (C-BAD) begins with installation of system components. Sensors, preferably biometric-based devices, should be installed to document and permit access to the following classified and non-classified areas of the organization: physical spaces such as offices, conference rooms, in addition to safes and filing cabinets; information systems such as personal computers, servers, mainframes et cetera; and communication networks such as telephones, internet and intranet access, faxes, and video systems. Biometric sensors should be intermixed with traditional password or personal identification and contactless tokens such as proximity cards or RFID tags. This combination increases the difficulty in penetrating the system from unauthorized personnel and if activity should occur, it will provide irrefutable evidence for use in an investigation.

The second step is to enter data concerning all employees into the C-BAD computer, which will help to categorize individuals as to potential insider risks. For example, a person with top secret clearance that has access to very sensitive information, areas, and infrastructure is placed in a category which monitors that individual more frequently and with more depth than a basic worker with confidential clearance and limited access. A low-level person may be monitored to record any attempts to access areas or information of which he does not have access, while a high-level person may be monitored as to his actions regarding communications, file copying, and patterns of classified access. An organization would develop specific normality, abnormality, risk, reporting thresholds, archiving rules, and security compartment models for classes of personnel based on access. The C-BAD computer would also store the biometric data of employees to provide the basis by which they are compared when sensor input of biometric scans entered in the system.

External communication links are established to receive reports and input from police, intelligence organizations, financial institutions, and other public and non-public sources relevant to a person's character and trustworthiness.

Another step applicable to those employees with high levels of access and trust is to establish communication links to examine external personnel relationships of employees with watch lists from terrorist organizations, FBI/CIA wanted lists, foreign linkages, links to organizations counter to the goal of the organization, financial data and other associations considered a threat to the organization.

Once the sensors are in place and the personnel is enrolled in the database along with external communication allow for checking lists and relationships, then access sensors are linked over a network to the C-BAD computer. The C-BAD computer then receives sensor input, records the information, and compares it against logic, normality, and abnormality models. C-BAD system operators can adjust model sensitivity to optimize the system's supervisory capabilities, and through the use of Artificial Intelligence (AI) or expert systems, the C-BAD computer will update models, learn patterns of normality, adjust the rule-based system, and analyze and incorporate feedback reports from investigative teams for future use.

Investigative teams must be established to respond to abnormalities. A security team may be a rapid response team for incidents where an immediate abnormality is occurring. An example of an immediate abnormality is when the sensors indicate a person is in multiple locations simultaneously or an individual is accessing classified information, and the system shows he did not enter the building. A more traditional job for the investigative teams is to flag an event as suspicious then apply a higher level of focus on the individual. An example might be when an individual has increased activity in the area of accessing and copying classified files. If the person subsequently increases after-hours activity and no one else in his division appears to change their pattern, the individual's supervisor may be contacted by the investigative team to procure an explanation.

DESCRIPTION AND OPERATION OF ALTERNATIVE EMBODIMENTS

An alternative embodiment includes the use of third-party C-BAD system administrators and investigation teams. This approach would eliminate the traditional use of co-workers and upper management as monitors and place this responsibility with an impartial third party.

CONCLUSION, RAMIFICATIONS, AND SCOPE OF

The Cooperative Biometrics Abnormality Detection system provides a novel approach to internal security by integrating biometrics and other sensors into an intelligent, reasoning system that will impartially monitor an organization's operation. The system's intention is to deter employees' exploitation of the organization in any form. The use of multiple and critically placed sensors increase the chances for detecting incidents and the intelligent, reasoning system provides a greater chance for detecting abnormalities over current approaches. Should a breach occur, the C-BAD system has an excellent chance over previous art to determine the extent of damage and the participant involved through system activity documentation.

While my above description contains many specificities, these should not be construed as limitations on the scope of the invention, but rather as an exemplification of one of the preferred embodiments. Many other variations are possible; for example, third-party system administration and additional types of inputs from external sources on employee relationships and activities may be utilized. Accordingly, the scope of the invention should be determined not by the embodiments illustrated, but by the appended claims and their legal equivalents.

ABSTRACT OF THE DISCLOSURE

The Cooperative Biometrics Abnormality Detection (C-BAD) system is a network of sensors that track personnel throughout physical locations, communications, and computer systems. These systems are then linked to a central computer that contains detailed information on the individual, and rule-based risk, relationship, and abnormality models that will deter, detect, and document possible insiders. It is only at this point that C-BAD will then objectively report suspicious activities to a supervisory team for further investigation. This System replaces the current method of labor-intensive subjective analysis, which has proven to be a weak deterrent and fraught with human error. C-BAD uses a full spectrum of sensors that identify personnel through the use of contact, contactless, biometrics, smart cards, or a combination of any one of these. The C-BAD central monitoring computer contains an inference engine based on artificial intelligence or a rule-based system, which reviews databases and furnished information.

I claim:

1. An integrated sensor and information system comprising:
    a central computer system containing rule-based software and models selected from a group consisting of abnormality, normality, personnel risks, security compartments, event reporting, external event resolution, investigation procedures, external resolution, external relationships resolution, and archiving repository;
    personnel identification sensors selected from the group consisting of contactless sensors, proximity sensors, tokens, keys, cards, and biometrics; and
    a communication network to link said sensors to said central computer system, wherein said personnel identification sensors configured as physical access sensors selected from the group consisting of hallways sensors, floors and areas sensors, safes, and cabinets sensors, internal and external doors sensors, wherein said personnel identification sensors configured as information access sensors selected from the group consisting of computers, printers, files, and copy or duplication commands.

2. The integrated sensor and information system of claim 1, wherein said personnel identification sensors are configured as communications access sensors selected from the group consisting of classified and unclassified telephones, intranet, Internet, fax, video, and other methods of communication.

3. The integrated sensor and information system of claim 1, wherein said central computer system receives input from an external personnel relationship database.

4. The integrated sensor and information system of claim 1, wherein said computer receives input from an external personnel events database.

5. The integrated sensor and information system of claim 1, wherein said sensors consist of multiple biometric sensors.

6. The integrated sensor and information system of claim 1, wherein said central computer system contains an artificial intelligent inference engine.

7. The integrated sensor and information system of claim 1, wherein said computer contains a rule-based expert system.

* * * * *